Figure 1:
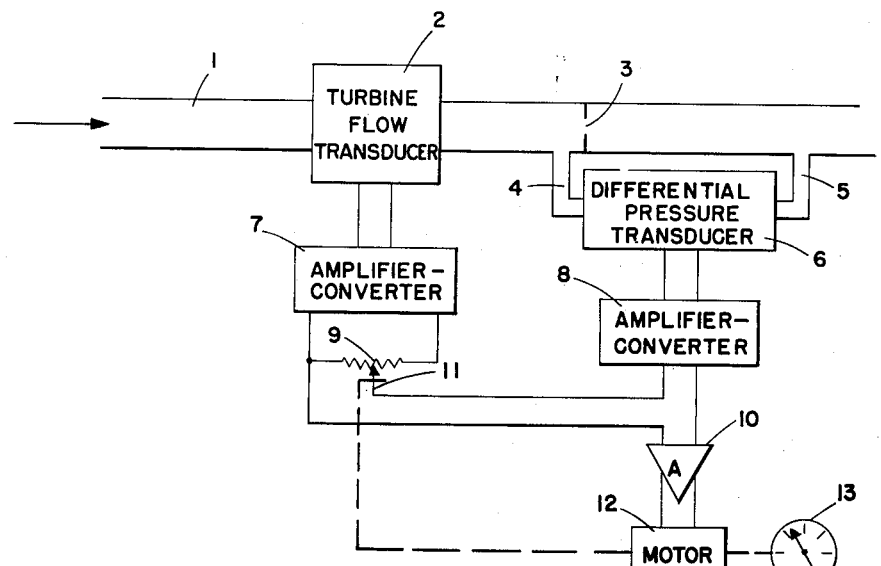

Dec. 4, 1956  R. H. BODEN ET AL  2,772,567
MASS FLOWMETER
Filed Aug. 21, 1953

INVENTOR.
ROBERT H. BODEN
JOHN E. WITHERSPOON
BY
*William R. Lane*
ATTORNEY

United States Patent Office 2,772,567
Patented Dec. 4, 1956

2,772,567

MASS FLOWMETER

Robert H. Boden, Tarzana, and John E. Witherspoon, Canoga Park, Calif., assignors to North American Aviation, Inc.

Application August 21, 1953, Serial No. 375,759

3 Claims. (Cl. 73—231)

This invention relates to measurement of the flow of fluids, and particularly to a device for measuring the mass flow of a fluid by the use of instruments ordinarily used only for measuring volumetric flow.

Flowmeters capable of measuring the flow rate in a conduit normally measure the volume of fluid passing a given point or some quantity which is a function of volumetric flow. For example, a propeller or turbine type flowmeter has an angular velocity proportional to the volume of fluid passing through it. The differential pressure type of flowmeter such as is attained by measuring the differential of pressure across an orifice or at points of differing diameter in a conduit of venturi shape measures the product of the volume of fluid passing therethrough per unit time and the density of the fluid. To obtain mass flow rate by use of differential pressure measurements requires measurement of density and extraction of a square root. If it is desired to know the mass of fluid passing through the former type meter it is required that the output of the meter be multiplied by the density of the fluid; but since the density of the fluid may vary due to changes in temperature and other conditions, multiplication of the volumetric flow rate by a constant does not suffice to yield an accurate measurement of the mass flow rate. Measurements of the actual density of the fluid as it passes through the flowmeter are extremely difficult. Of course, in most fluids the density varies principally with temperature, and a curve for a known fluid may be plotted which shows the variation in density with variations in temperature. The temperature of the fluid may then be measured and the corresponding density may be multiplied by the volumetric flow rate. In order to eliminate the necessity of measuring the temperature of the liquid and finding the density to determine the mass flow rate of the liquid this invention contemplates apparatus in which the density factor is entirely eliminated from a determination of the mass flow rate. This is achieved by dividing the measured differential pressure across an orifice, venturi or flow nozzle by the output of a volumetric flowmeter such as the speed of rotation of a turbine type element, both of which are metering the fluid flow. The quotient is directly proportional to the mass flow rate of the fluid. Both the differential pressure and the volume flow can be converted into proportional electrical signals. These signals can then be applied to the modified input circuit of a self-balancing potentiometer in such a way that the quotient is indicated by the displacement of the potentiometer.

It is therefore an object of this invention to provide an improved flowmeter.

It is another object of this invention to provide means for measuring mass flow rate by the use of end instruments capable of measuring only volumetric flow rates.

It is another object of this invention to provide means for measuring mass flow rate which automatically compensates for variations in density of the fluid whose flow rate is being measured.

Figure 2:
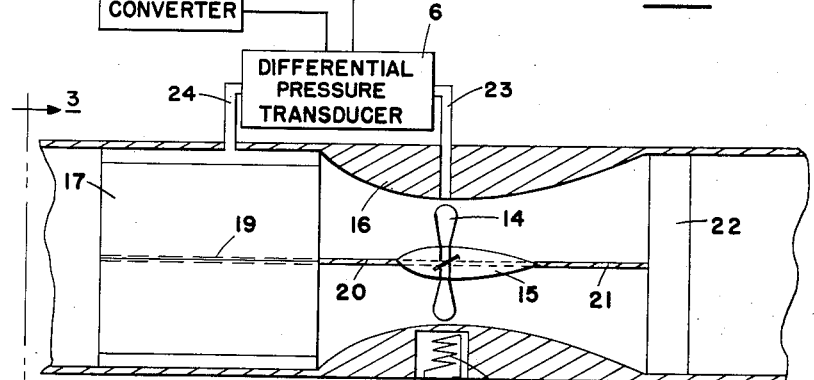
Figure 3:
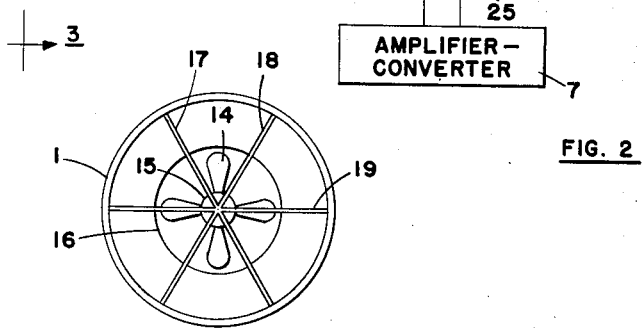

Other objects of invention will become apparent from the following description taken in connection with the accompanying drawings, in which:

Fig. 1 is a block diagram of the invention;
Fig. 2 is a schematic of a second embodiment of the invention;
And Fig. 3 is a sectional view taken at 3—3 in Fig. 2.

Referring to Fig. 1, it is desired to measure a mass flow rate of fluid flowing in conduit 1, and to this end a volumetric flowmeter 2 having an output in the form of an electrical signal is employed. Also situated in conduit 1 is an orifice 3 across which a differential pressure $\Delta P$ exists. The conduit on either side of the orifice is connected by conduits 4 and 5 to a differential pressure transducer 6 having an output in the form of an electrical signal. If the outputs of transducer 6 and flowmeter 2 are both D.-C. electrical signals or both A.-C. electrical signals of sufficient strength, one may be divided by the other directly. In Fig. 1 the electrical outputs from volumetric flowmeter 2 and differential pressure transducer 6 are connected to amplifier-converters 7 and 8, respectively, so that the outputs of these amplifier-converters are signals proportional in magnitude to the volumetric flow rate measured by the volumetric flowmeter and the pressure drop measured by the differential pressure transducer. These signals may be D.-C. or A.-C. signals.

The output of amplifier-converter 7 is connected across the fixed terminals of potentiometer 9, while the output of amplifier-converter 8 is connected in series between amplifier 10 and slider 11 of potentiometer 9. One fixed terminal of potentiometer 9 is also connected to the input of amplifier 10, while the output of amplifier 10 is connected to drive motor 12 which is mechanically connected as shown to drive slider 11. Drive motor 12 also drives indicator-recorder 13 which indicates the mechanical displacement of the drive motor and slider 11.

The manner in which density of the fluid whose mass flow is measured is eliminated from the computation of mass flow rate is shown by the following derivation:

The fluid flow equation for orifices, flow nozzles and venturis is:

$$W = K_1 \sqrt{\rho \Delta P} \tag{1}$$

where $W$ = flow rate #/sec.
$K_1$ = meter constant
$\rho$ = fluid density #/cu. ft.
$\Delta P$ = differential pressure across the meter The flow equation for a volumetric flowmeter, such as a turbine type is:

$$V = K_2 f \tag{2}$$

$V$ = flow rate cu. ft./sec.
$K_2$ = meter constant
$f$ = measured variable, such as speed of turbine in cycles/sec. or voltage Also for a volumetric flowmeter where $$W = \rho V = K_2 \rho f \tag{3}$$

$W$ = flow rate #/sec.

Squaring equation (1)

$$W^2 = K_1^2 \rho \Delta P$$

and $$\rho = \frac{W^2}{K_1^2 \Delta P} \tag{4}$$

Substituting (4) in (3)

$$W = K_2 \frac{W^2 f}{K_1^2 \Delta P}$$

Dividing both sides by W $$1 = \frac{K_2 W f}{K_1^2 \Delta P}$$

and $$W = \frac{K_1^2}{K_2} \frac{\Delta P}{f}$$

or $$W = K \frac{\Delta P}{f} \quad (5)$$

Thus, it is seen that the mass flow rate is computed by multiplying a constant determined by the characteristics of the apparatus by a quotient of the differential pressure across an orifice such as orifice 3 or across a venturi or flow nozzle by the flow rate as measured by a turbine or propeller type flowmeter.

In operation, this computation is performed by the self-balancing potentiometer arrangement represented by amplifier 10, drive motor 12, potentiometer 9 and slider 11. The output of amplifier-converter 8 is an electrical signal proportional to the differential pressure across differential pressure transducer 6. The output of amplifier-converter 7 is a signal proportional to the output of flowmeter 2. The position of slider 11 of potentiometer 9 when drive motor 12 is at rest is proportional to the voltage output of amplifier-converter 8 divided by the output of amplifier converter 7. But since the output of amplifier-converter 8 is proportional to $\Delta P$, and since the output of amplifier-converter 7 is proportional to $f$, the displacement of slider 11 is proportional to mass flow rate in accordance with Equation 5

$$\left( W = \frac{K_1^2}{K_2} \frac{\Delta P}{f} \right) \text{ or } \left( W = K \frac{\Delta P}{f} \right)$$

Indicator-recorder 13 may be calibrated to read mass flow rate directly, since its displacement is proportional to the angular displacement of drive motor 12 and, in turn, to the linear displacement of slider 11. Thus, it is seen that although flowmeter 2 measures volume flow and transducer 6 measures differential pressure, indicator-recorder 13 indicates not volumetric flow rate, but mass flow rate.

In Figs. 2 and 3 is illustrated a slightly modified form of the invention in which rotating element 14 of turbine flowmeter 15 is suspended in throat section 16 of a venturi within conduit 1. Flow straighteners 17, 18, 19 are employed upstream of the flowmeter, while support structures 20 and 21 connect the flowmeter to the flow straighteners and to transverse support 22 downstream of the flowmeter. From the throat of the venturi, conduit 23 connects to differential pressure transducer 6 in the manner indicated in Fig. 1, and the transducer is also connected to a point upstream of the throat by conduit 24. Pickoff 25 is situated opposite rotating element 14 and is connected to the input of amplifier-converter 7.

If the blades of rotating element 14 are magnetized at the tips, pickoff coil 25 has an electrical output with a frequency directly proportional to the angular velocity of the rotating element. Other methods of converting volumetric flow rate into an electrical signal are well known in the volumetric flowmeter art. Amplifier-converter 7 amplifies this signal and converts it to a signal usable in conjunction with the output of amplifier-converter 8 in the electrical computation performed by the self-balancing potentiometer. The output signals from amplifier-converters 7 and 8 may be either alternating current or direct current, but they need to be the same. The differential pressure transducer may conveniently be of the type disclosed in Patent No. 2,641,131, issued June 9, 1953, to Charles C. Waugh, for "Pressure Gauge," wherein the output is in form of a direct-current electrical signal. If this type of transducer is utilized, amplifier-converter 7 should include means for rectifying the alternating current output of pickoff 25 in order that both signals reach the potentiometer with the same general characteristics.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for measuring the mass flow rate of a fluid in a conduit comprising a venturi section restricting the cross-sectional area of said conduit, a volumetric flowmeter located in said venturi, a differential pressure transducer for measuring the pressure drop across said venturi, and means for dividing the output of said transducer by the output of said meter to yield mass flow rate in said conduit.

2. Mass flow rate measuring means for measuring mass flow rate in a conduit comprising a venturi section in said conduit, a rotatable vane type flowmeter located within said conduit at its smallest transverse dimension, pickoff means for generating an electrical signal proportional to the angular velocity of said volumetric flowmeter, means having an output in electrical form for measuring the pressure drop across said venturi, and electrical self-balancing potentiometer means for dividing the output of said differential pressure transducer means by the output of said pickoff to thereby produce a signal proportional to mass flow rate in said conduit.

3. Means for measuring the mass flow rate of a fluid in a conduit despite the changes in density of said fluid comprising a venturi section in said conduit, means in said conduit having an output in electrical form for measuring volumetric flow rate through said venturi section, differential pressure transducer means connected to said conduit and responsive to a differential pressure produced by said venturi section, said differential pressure transducer having an output in electrical form for measuring the quotient of the square of mass flow rate divided by fluid density in said venturi section, and a self-balancing potentiometer connected to the outputs of both said measuring means to divide said differential pressure signal by said volumetric flow signal to thereby obtain a measure of the mass flow rate at said conduit.

References Cited in the file of this patent

UNITED STATES PATENTS

| | | |
|---|---|---|
| 720,188 | Seidener | Feb. 10, 1903 |
| 2,472,609 | Moore | June 7, 1949 |
| 2,692,501 | Erwood | Oct. 26, 1954 |